US012623164B2

(12) United States Patent
Sekot et al.

(10) Patent No.: US 12,623,164 B2
(45) Date of Patent: May 12, 2026

(54) FILTER PRESS ADAPTER

(71) Applicant: Takeda Pharmaceutical Company Limited, Osaka (JP)

(72) Inventors: Gerhard Sekot, Osaka (JP); Lucia Gnauer, Ebersbrunn (AT); Wolfgang Teschner, Vienna (AT)

(73) Assignee: Takeda Pharmaceutical Company Limited, Osaka (JP)

( * ) Notice: Subject to any disclaimer, the term of this patent is extended or adjusted under 35 U.S.C. 154(b) by 326 days.

(21) Appl. No.: 18/009,286

(22) PCT Filed: Jun. 9, 2021

(86) PCT No.: PCT/US2021/036652
§ 371 (c)(1),
(2) Date: Dec. 8, 2022

(87) PCT Pub. No.: WO2021/252656
PCT Pub. Date: Dec. 16, 2021

(65) Prior Publication Data
US 2023/0219019 A1     Jul. 13, 2023

Related U.S. Application Data

(60) Provisional application No. 63/036,718, filed on Jun. 9, 2020.

(51) Int. Cl.
*B01D 25/164*     (2006.01)
*B01D 25/21*     (2006.01)
*B01D 25/26*     (2006.01)

(52) U.S. Cl.
CPC ......... *B01D 25/164* (2013.01); *B01D 25/215* (2013.01); *B01D 25/26* (2013.01)

(58) Field of Classification Search
CPC ..... B01D 25/215; B01D 25/164; B01D 25/26
See application file for complete search history.

(56) References Cited

U.S. PATENT DOCUMENTS

| | | | | |
|---|---|---|---|---|
| 3,730,345 A | * | 5/1973 | Suzuki | ................. B01D 25/302 |
| | | | | 210/231 |
| 5,388,629 A | | 2/1995 | Kami | |

(Continued)

FOREIGN PATENT DOCUMENTS

| | | | | |
|---|---|---|---|---|
| CN | 2910323 Y | * | 6/2007 | |
| CN | 110344970 A | | 10/2019 | |

(Continued)

OTHER PUBLICATIONS

International Search Report and Written Opinion of International Application PCT/US21/36652, mailed on Nov. 9, 2021, 12 pages.

(Continued)

*Primary Examiner* — Bradley R Spies
*Assistant Examiner* — Jeannie McDermott
(74) *Attorney, Agent, or Firm* — Morgan, Lewis & Bockius LLP

(57) ABSTRACT

A filter press device includes a supporting frame and elongated side rails disposed parallel and horizontally on the supporting frame. A following head assembly is disposed on an end portion of the supporting frame, and a following head assembly is movably disposed on another end portion of the supporting frame. The elongated side rails support a combination of filter plates of varying sizes through one or more adapters. An adapter plate interposes between adjacent filter plates of different sizes, providing fluidic communication between the different sized filter plates.

10 Claims, 15 Drawing Sheets

(56) References Cited

U.S. PATENT DOCUMENTS

| | | | |
|---|---|---|---|
| 5,672,272 A * | 9/1997 | Baer | B01D 25/215 |
| | | | 210/231 |
| 6,260,004 B1 | 7/2001 | Hays et al. | |
| 8,289,179 B2 | 10/2012 | Weinstein et al. | |
| 9,008,951 B2 | 4/2015 | Ide et al. | |
| 9,052,259 B2 | 6/2015 | Yacoub et al. | |
| 9,244,053 B2 | 1/2016 | Campbell et al. | |
| 9,255,578 B2 | 2/2016 | Sharpe, Jr. et al. | |
| 10,006,883 B2 | 6/2018 | Sugiyama et al. | |
| 10,330,579 B2 | 6/2019 | Sugiyama et al. | |
| 10,955,250 B2 | 3/2021 | Leone et al. | |
| 11,339,737 B1 | 5/2022 | Tian et al. | |
| 11,875,371 B1 | 1/2024 | Doner | |
| 2005/0061729 A1 * | 3/2005 | Strohm | B01D 25/26 |
| | | | 210/284 |
| 2005/0145023 A1 | 7/2005 | Rhodes et al. | |
| 2007/0271903 A1 | 11/2007 | Rhodes et al. | |
| 2010/0065513 A1 * | 3/2010 | Hibble | B01D 25/176 |
| | | | 29/428 |
| 2012/0027630 A1 | 2/2012 | Forsberg et al. | |
| 2012/0046848 A1 | 2/2012 | Suwa et al. | |
| 2014/0299534 A1 * | 10/2014 | Neumann | B01D 25/164 |
| | | | 29/428 |
| 2018/0174375 A1 | 6/2018 | Frankowski et al. | |
| 2018/0216484 A1 | 8/2018 | Vangari et al. | |
| 2019/0153971 A1 | 5/2019 | Prabhala et al. | |
| 2019/0287320 A1 | 9/2019 | Slusar | |
| 2019/0314742 A1 | 10/2019 | Duby | |
| 2020/0400544 A1 | 12/2020 | Etschmaier et al. | |
| 2021/0223154 A1 | 7/2021 | Moravec et al. | |
| 2022/0357302 A1 | 11/2022 | Cronin et al. | |
| 2023/0044784 A1 | 2/2023 | Hauser et al. | |
| 2023/0068962 A1 | 3/2023 | Zambon et al. | |

FOREIGN PATENT DOCUMENTS

| | | | | |
|---|---|---|---|---|
| CN | 110575688 A | | 12/2019 | |
| CN | 210057500 U | * | 2/2020 | |
| CN | 113639844 A | | 11/2021 | |
| CN | 114893332 A | | 8/2022 | |
| CN | 116879390 A | | 10/2023 | |
| DE | 10216305 A1 | | 11/2003 | |
| EP | 3473319 A1 | | 4/2019 | |
| EP | 3628388 A1 | | 4/2020 | |
| EP | 3628972 A1 | | 4/2020 | |
| EP | 4300074 A1 | | 1/2024 | |
| KR | 10-2006-0041569 A | | 5/2006 | |
| WO | WO-2019128618 A1 | * | 7/2019 | B01D 25/21 |

OTHER PUBLICATIONS

International Preliminary Report on Patentability of International Application PCT/US21/36652, mailed on Dec. 13, 2022, 6 pages.

* cited by examiner

FILTER PRESS ADAPTER

CROSS REFERENCE TO RELATED APPLICATIONS

This application is a 371 U.S. National Phase Application of International Patent Application No.: PCT/US2021/036652, entitled "Filter Press Adapter," filed Jun. 9, 2021, which claims priority to U.S. Provisional Patent Application Ser. No. 63/036,718, entitled "Filter Press Adapter," filed Jun. 9, 2020, each of which is hereby incorporated by reference in entirety for all purposes.

BACKGROUND OF THE INVENTION

Field of the Invention

The present disclosure relates to a filter press device. More particularly, the present disclosure relates to adaptors for a filter press device.

Description of Related Art

Filter presses are well known and extensively utilized for separating solids from slurries. Referring briefly to FIG. 13, a conventional filter press device will now be described to aid in understanding the general operation of the filter press device. Filter press 1300 utilizes a series of plates 1310 to filter a media, such as a slurry. Plates 1310 includes filter plates 1312 and frame plates 1314 that are adjacent to one another and in an alternating configuration, such that each frame plate 1314 is neighbored by two filter plates 1312. Plates 1310 further include end plates 1316, which are configured for contacting and interfacing with one of fixed head mechanism 1340 and following head 1352. Each plate 1310 is independently and slidably supported and on frame 1320 by pair of elongated side rails 1330. Support arms 1332 of each plate 1310 interact with one of elongated side rails 1330. In this way, a lateral distance between elongated side rails 1330 defines a size of plate 1310 that can be used with filter press 1310.

Following head mechanism 1350 includes following head 1352 that abuts end plate 1316 and, optionally, controller 1354 and hydraulic cylinder 1356, which collectively provide power and instructions to following head 1352. A space defined between each filter plate 1312 and frame plate 1314 is lined with a filter media, such as a filter cloth or a membrane. An internal cavity is defined by frame plate 1314 with filter media lined on each side of frame plate 1314.

Each plate 1310 includes one or more apertures permitting fluidic communication between filter plates 1312 and frame plates 1314. In this way, a filtering surface area increases proportional to a number of filter plates 1312 and frame plates 1314 used with filter press 1300. Slurry is pumped into and through filter press 1300 via fix head mechanism 1340 and/or end plate 1316 for collecting solids in the form of a cake in the internal cavities defined by frame plates 1314. One or more inlets of each frame plate 1314 is provided to introduce slurry into the internal cavities on an upstream side of the filter media, and one or more outlets communicate with each internal cavity on a downstream side of the filter media. Once the internal cavities in the frame plates 1314 are filled with slurry, the delivery pressure of the incoming slurry is adjusted such that the liquid component is displaced through the filter media and the solid particulate matter is retained within the internal cavity upstream from the filter media. The filtered liquid, or filtrate, moves to the outlet(s), where it is discharged. The filter cycle continues until completion.

In some embodiments, upon competition, following head 1352 is backed away from plates 1310. Plates 1310 are moved apart from one another into an open position to permit discharge of the cake, which is collected in frame plates 1314. To permit movement of plates 1310 into an open position, a plate shifting mechanism is typically provided on adjacent opposing sides of filter press 1300 for permitting automatic or manual control over plate 1310 movement and cake discharge.

While filter press devices are available in a range of sizes, each filter press device is limited to accepting a restricted range of plate sizes. This restriction is because each respective plate is individually supported on the elongated side rails of the filter press and a distance between the elongated side rails is fixed and defined by the filter press device. Oversized plates are too large to fit between the elongated side rails, while undersized plates slip through the elongated side rails since the support mechanism of the undersized plates cannot reach both of the elongated side rails. Furthermore, if undersized plates can be accommodated on the elongated side rails, the inlets and outlets of the do not align with the inlets and outlets of the media, such that fluidic communication in the filter press device cannot exist.

Thus, prior to the present disclosure there existed a need to modularly incorporate filters plates of different sizes with different sized conventional filter press device.

The information disclosed in this Background of the Invention is only for enhancement of understanding of the general background of the invention and should not be taken as an acknowledgement or any form of suggestion that this information forms the prior art already known to a person skilled in the art.

BRIEF SUMMARY

Advantageously, the systems and methods detailed in the present disclosure address the shortcomings in the prior art detailed above. The present disclosure a filter press device capable of accommodating different sized plates. A filter press device includes a supporting frame. A first elongated side rail and a second elongated side rail are disposed parallel thereto and on a first side portion and a second side portion of the supporting frame, respectively. A stationary head assembly is disposed on a first end portion of the supporting frame and adjacent to each of the first elongated side rail and the second elongated side rail. The stationary head assembly includes a first array of channels that is defined by a first length. A following head assembly is disposed on a second end portion of the supporting frame and adjacent to each of the first elongated side rail and the second elongated side rail. The following head assembly is movable along a lengthwise direction of the first elongated side rail and the second elongated side rail both forwardly towards and rearwardly away from the stationary head assembly. A plurality of plates are supported on and between the first elongated side rail and the second elongated side rail by one or more frame adapters. The one or more adapters slidably couple each plate in the plurality of plates to the first elongated side rail and the second elongated side rail. Each respective plate in the plurality of plates includes a second array of channels defined by a first second. Each respective plate in the plurality of plates further includes a first support arm and a second support arm that outward extend from opposing side surfaces of the respective plate. Each respective support arm supports the respective plate on a member selected from the first elongated side rail and the second elongated side rail. Moreover, each respective support arm is accommodated by a frame adapter in the one or more frame adapters. The plurality of plates traverses between the stationary head assembly and the following head assembly in accordance with a movement of the following head assembly. An adapter plate interposes between the plurality of plates and the stationary head assembly. The adapter plate includes a first surface that abuts an adjacent surface of an end plate in the plurality of plates, and a second surface that opposes the first surface and abuts an adjacent surface of the stationary head assembly. In addition, the adapter plate includes a plurality of channels. Each respective channel in the plurality of channels traverses from the first surface to the second surface and connects a corresponding channel in the first array on channels on the first surface to a corresponding channel in the second array of channels of the second surface. In this way, fluidic communication is provided between the plurality of plates and the stationary head via the adapter plate.

In some embodiments, each of the one or more frame adapters includes a supporting frame adapter. The supporting frame adapter includes a first enclosing portion and a second enclosing portion. This second enclosing portion opposes the first enclosing portion and is removably coupled thereto. Each of the first enclosing portion and the second enclosing portion of the supporting frame adapter includes a first groove, a second groove, and a coupling mechanism. The first groove is disposed at a first edge portion of the enclosing portion and is configured to accommodate a portion of the support arm. The coupling mechanism is configured to removably couple with a corresponding coupling mechanism of an opposing enclosing portion of the supporting frame adapter. The second groove is disposed at a second edge portion of the enclosing portion and configured to support the respective plate on a member selected from the first elongated side rail and the second elongated side rail.

In some embodiments, for each enclosing portion of the supporting frame adapter, each coupling mechanism includes a through hole that is disposed on a face of the enclosing portion and aligned with a corresponding through hole of the opposing enclosing portion of the supporting frame adapter. The through hole accommodates a connector that penetrates each through hole of the supporting frame adapter.

In some embodiments, each of the one or more frame adapters includes an encompassing frame adapter that surrounds a first external surface of a respective plate in the plurality of plates. The encompassing frame adapter includes a through-hole that defines a second external surface and an internal surface of the encompassing frame adapter. The internal surface corresponds to the first exterior surface the respective plate and is configured to accommodate the plate. Moreover, the second external surface includes a first encompassing adapter support arm that extends outwardly from a first side surface of the external surface and a second encompassing adapter support arm that extends outwardly from a second side surface opposing the first side surface of the external surface. Each respective encompassing adapter support arm supports the respective plate on a member selected from the first elongated side rail and the second elongated side rail.

In some embodiments, the encompassing frame adapter is integrally formed with the plate.

In some embodiments, the encompassing frame adapter further includes a gasket disposed about the internal surface of the encompassing adapter, such that the gasket interposes between the internal surface of the encompassing adapter and the suspension frame of the filter plate.

In some embodiments, each of the one or more frame adapters includes a first sleeve frame adapter and a second sleeve frame adapter. Each of the first sleeve frame adapter and the second sleeve frame adapter includes a first groove and a second groove. The first groove is disposed at a first edge of the sleeve frame adapter facing a first exterior surface of a respective plate in the plurality of plates. Further, the first groove accommodates a member selected from the first support arm or the second support arm of each respective plate in the plurality of plates. The second groove is disposed at a second edge of the sleeve frame adapter and supports the plurality of plates on a member selected from the first elongated side rail and the second elongated side rail.

In some embodiments, the present disclosure provides another filter press device that includes a supporting frame. A first elongated side rail and a second elongated side rail are disposed parallel thereto and on a first side portion and a second side portion of the supporting frame, respectively. A stationary head assembly is disposed on a first end portion of the supporting frame and adjacent to each of the first elongated side rail and the second elongated side rail. The stationary head assembly includes a first array of channels that is defined by a first length. A following head assembly is disposed on a second end portion of the supporting frame and adjacent to each of the first elongated side rail and the second elongated side rail. The following head assembly is movable along a lengthwise direction of the first elongated side rail and the second elongated side rail both forwardly towards and rearwardly away from the stationary head assembly. A plurality of plates are supported on and between the first elongated side rail and the second elongated side rail by one or more frame adapters. The one or more adapters slidably couple each plate in the plurality of plates to the first elongated side rail and the second elongated side rail. Each respective plate in the plurality of plates includes a second array of channels defined by a first second. Each respective plate in the plurality of plates further includes a first support arm and a second support arm that outward extend from opposing side surfaces of the respective plate. Each respective support arm supports the respective plate on a member selected from the first elongated side rail and the second elongated side rail. Moreover, each respective support arm is accommodated by a frame adapter in the one or more frame adapters. The plurality of plates traverses between the stationary head assembly and the following head assembly in accordance with a movement of the following head assembly. An adapter plate interposes between the plurality of plates and the stationary head assembly. The adapter plate mechanism includes a first adapter plate and a second adapter plate. The first adapter plate includes a first surface that abuts an adjacent surface of an end plate in the plurality of plates, and a second surface opposing the first surface and facing a third surface of the second adapter plate. The first adapter plate further includes a first plurality of channels, with each respective channel in the first plurality of channels being aligned with a corresponding channel in the second array of channels and traversing from the first surface to the second surface. The second adapter plate includes the third surface, a fourth surface that opposes the third surface and faces a fifth surface of the stationary head assembly, and a second plurality of channels. Each respective channel in the second plurality of channels is aligned with a corresponding channel in the first array of channels and traverses from the first surface to the second surface. Additionally, the adapter plate mechanism includes a plurality of tubes. Each respective tube in the plurality of tubes extends from a corresponding channel from the first plurality of channels and a corresponding channel from the second plurality of channels. In this way, fluidic communication is provided between the plurality of plates and the stationary head via the adapter plate mechanism.

In some embodiments, each respective tube in the plurality of tubes is a flexible tube.

In some embodiments, the adapter plate mechanism further includes a plurality of spacers. Each respective spacer in the plurality of spacers extends horizontally and interposes between the first adapter plate and the second adapter plate.

Other features and advantages of the invention will be apparent from, or are set forth in more detail in, the accompanying drawings, which are incorporated herein, and the following Detailed Description, which together serve to explain certain principles of exemplary embodiments of the present invention.

Figure 1A:
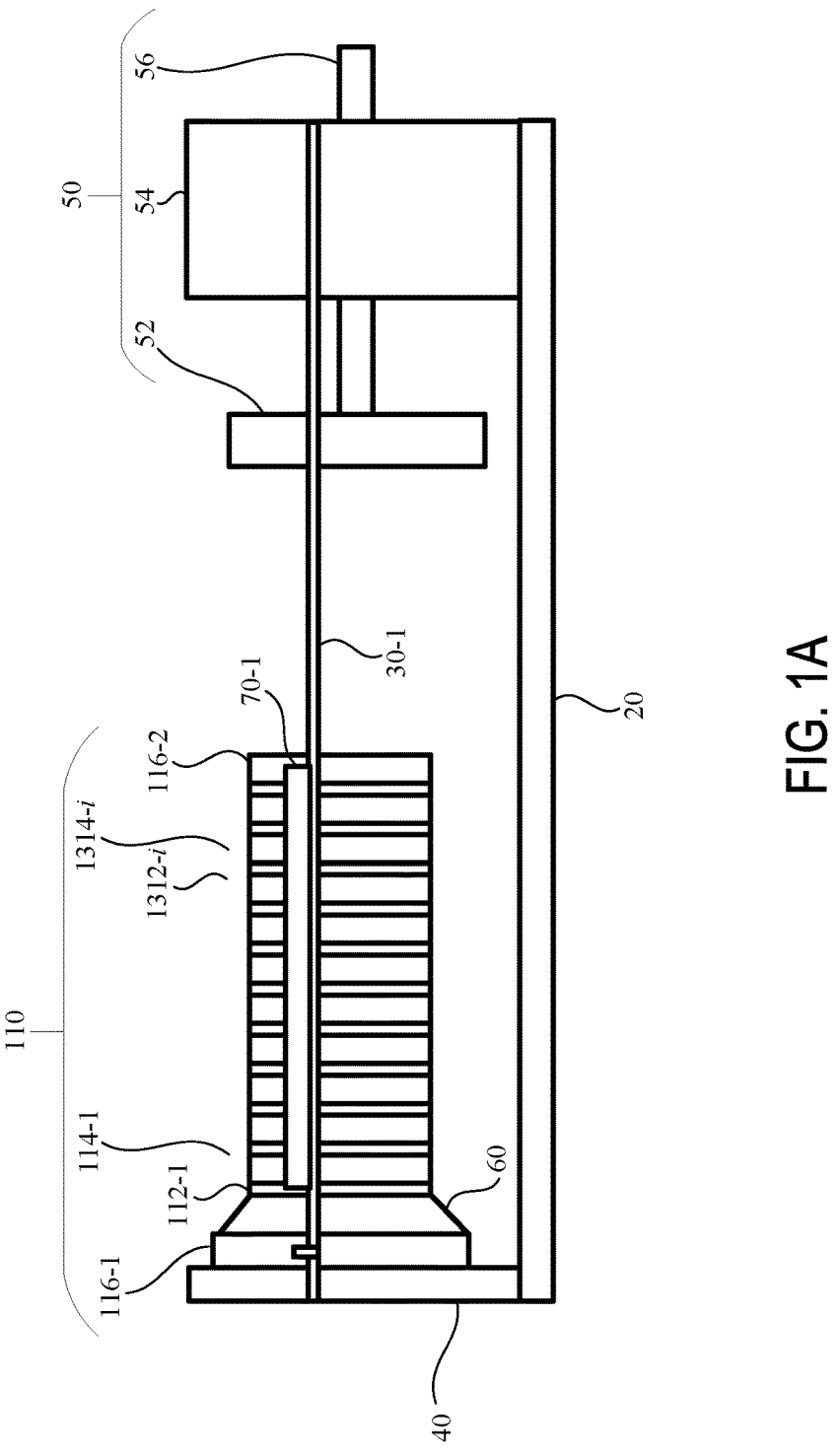
FIG. 1A illustrates a view of an exemplary filter press device including an adapter plate in accordance with embodiments of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will also be understood that, although the terms first, second, etc. may be used herein to describe various elements, these elements should not be limited by these terms. These terms are only used to distinguish one element from another. For example, a first plate could be termed a second plate, and, similarly, a second plate could be termed a first plate, without departing from the scope of the present disclosure. The first plate and the second plate are both plates, but they are not the plate.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Furthermore, when a reference number is given an "$i^{th}$" denotation, the reference number refers to a generic component, set, or embodiment. For instance, a plate termed "plate i" refers to the $i^{th}$ plate in a plurality of plates.

Embodiments of the present disclosure are described in the context of filter press devices. The filter press devices of the present disclosure can be of various types including recessed filter presses, plate and frame filter presses, membrane plate filter presses, and viscose filter presses. The filter press devices of the present disclosure can also be utilized for a variety of applications including pigment and/or dye manufacturing (e.g., finishing, desalting, waste neutralization, etc.), food and agricultural product processing (e.g., sugar processing), chemical processing (e.g., coolant recovery, etc.), recycling and environmental processing (e.g., industrial waste processing, flue gas desulphurization, etc.), pulp and/or paper processing (e.g., coatings waste treatment, etc.), mineral and/or mining processing, and the like. Additionally, the filter press devices of the present disclosure can be oriented both vertically and horizontally.

Figure 1B:
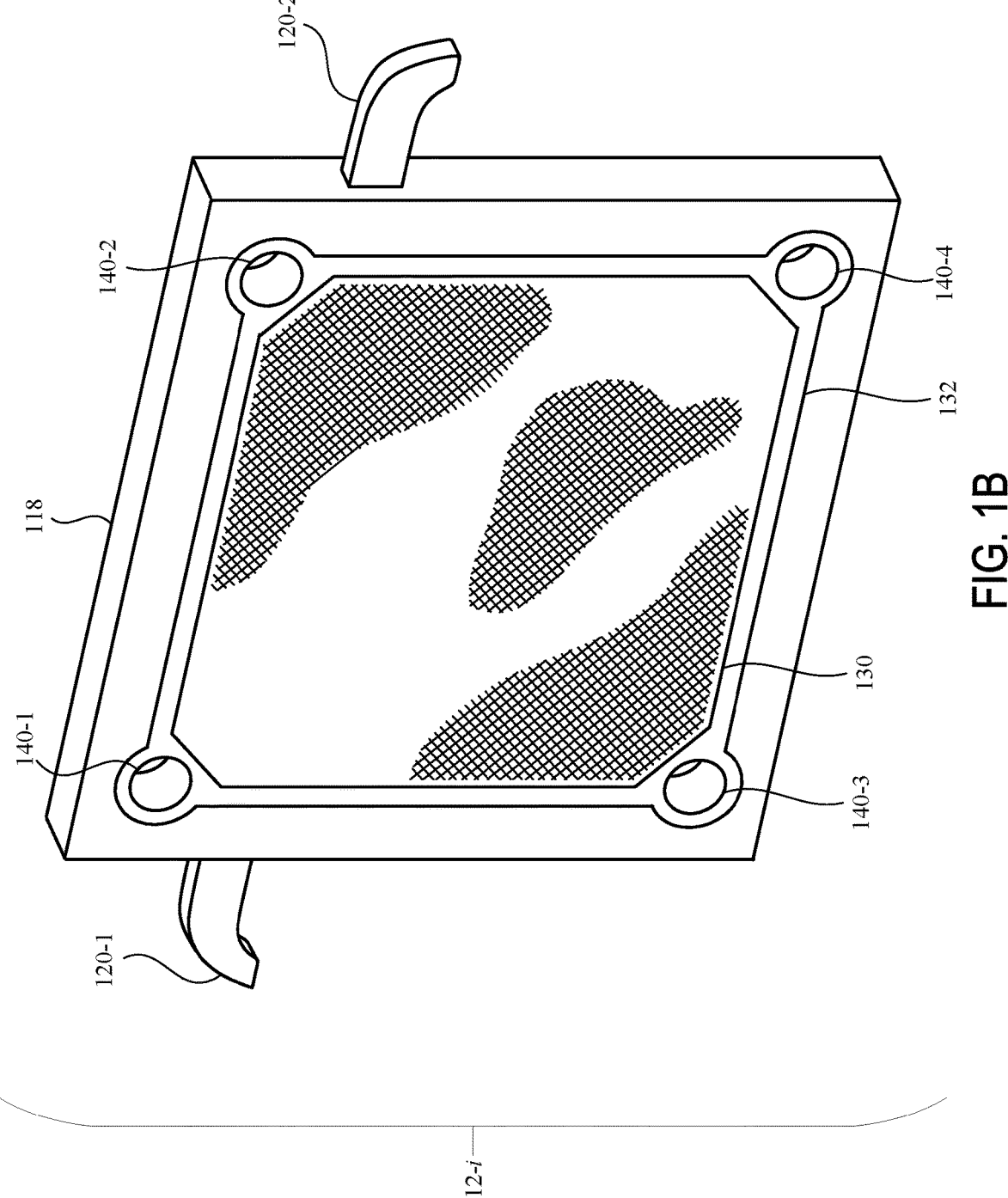
FIG. 1B illustrates a view of an exemplary filter plate in accordance with embodiments of the present disclosure.

Referring to FIGS. 1A-1B, there is depicted an exemplary filter press device in accordance with some embodiments of the present disclosure. As shown, filter press 10 includes a supporting frame (e.g., supporting frame 20) that forms a foundation for filter press 10. A first elongated side rail and a second elongated side rail such as first elongated side rail 30-1 and second elongated side rail 30-2 are disposed parallel to each other and on a first side portion and a second side portion of supporting frame 20, respectively. Together, elongated side rails 30 accommodate a plurality of plates such as plates 110 that interpose between and slidably engage with elongated side rails 30.

A stationary head assembly such as stationary head assembly 40 is disposed on a first end portion of supporting frame 20. In this way, stationary head assembly 40 is adjacent to each elongated side rail 30 with a least a portion of stationary head assembly 40 interposing between elongated rails 30. Stationary head assembly 40 further includes one or more inlets that introduce a slurry media into filter press device 10 and one or more outlets that collect a filtrate of the media from filter press device 10. Collectively, the one or more inlets and one or more outlets of the stationary head assembly 40 define a first array of channels.

A following head assembly such as following head assembly 50 is disposed on a second end portion of supporting frame 20 opposing stationary head assembly 40 and adjacent to each elongated side rail 30. A portion of following head assembly 50 is slidably movable along a lengthwise (e.g., longitudinal) direction of elongated side rails 30, such that following head assembly 50 traverses forwardly towards or rearwardly from stationary head assembly 40 in accordance with an instruction provided to filter press device 10. In some embodiments, following head assembly 50 includes a following head such as following head 52 and an actuator mechanism (e.g., hydraulic cylinder 56, controller 54, etc.) coupled to and controlling following head 52. In this way, the actuator mechanism facilitates power supply and/or control instructions for following head 52 movement. However, the present disclosure is not limited thereto.

Filter press 10 includes a plurality of plates such as plates 110 that is removably supported on and interposing between elongated side rails 30. Each respective plate 110 slidably traverses between stationary head assembly 40 and following head assembly 50, for instance, in accordance with a movement of following head assembly 50. While plates 110 generally move as a collective unit due to a motion of following head assembly 50, each respective plate 110 is capable of independently traversing elongated side rails 30.

Figure 1C:
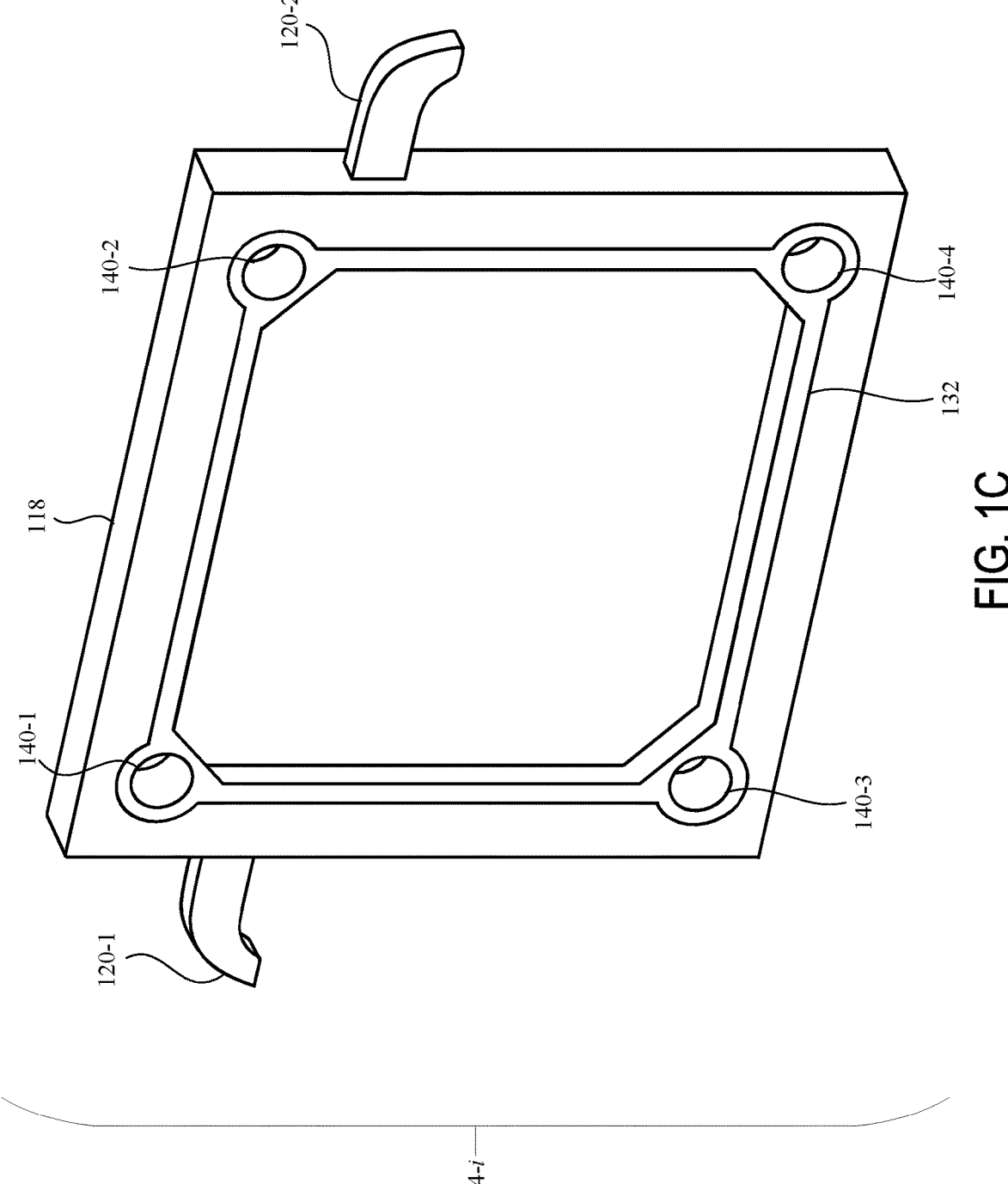
FIG. 1C illustrates a view of an exemplary frame plate in accordance with embodiments of the present disclosure.

In some embodiments, plates 110 include both gasket (e.g., sealed) and non-gasket type plates. Moreover, in some embodiments, plates 110 of the present disclosure include recessed chamber plates, membrane (e.g., diaphragm) plates, and frame plates. For instance, in some embodiments, plates 110 include a plurality of filter plates such as filter plates 112 (e.g., filter plate 112-*i* of FIG. 1B) and a plurality of frame plates such as frame plates 114 (e.g., frame plate 114-*i* of FIG. 1C). Each respective frame plate 114 includes a corresponding filter plate 112 disposed on each side thereof. Furthermore, in some embodiments, plates 110 include one or more end plates such as end plates 116 that interface with one of stationary head assembly 40 and following head assembly 50. In some embodiments, end plates 116 includes one or more inlets that introduce a slurry media into filter press device 10 and one or more outlets that collect a filtrate of the media from filter press device 10. For instance, in some embodiments, the inlets and outlets of end plate 116 align and communicate with the inlets and outlets of stationary head assembly 40. However, the present disclosure is not limited thereto.

Each respective plate 110 includes a suspension frame such as suspension frame 118, which forms a supporting structure of plate 110. Suspension frame 118 includes a peripheral edge portion having a first side and a second side, each of which surrounds a central portion of suspension frame 118. Each respective plate 110 further includes a second array of channels (e.g., first channel 140-1, second channel 140-2, . . . , fourth channel 140-4), with each respective channel disposed at a corresponding corner of plate 110. The second array of channels of the respective plate 110 define inlets and outlets for media (e.g., slurry) of filter press device 10, and in combination with stationary head assembly 40 provide fluidic communication throughout plates 110 for filtering slurry with filter press device 10.

For each respective filter plate 112, each side of the peripheral edge portion includes a textured surface configured to draw a filtrate towards the one or more outlets of filter plate 112. For each respective frame plate 114, each side of the peripheral edge portion recesses inwardly towards a central plane of suspension frame 118, which forms an internal cavity for forming a cake or filtrate from the slurry. A first filter media and, optionally, a second filter media extend across a surface of the first side and the second side of the peripheral edge portion respectively; such the internal cavity is defined by frame plate 114 with filter media lined on each side of frame plate 114. Accordingly, the slurry introduced through the inlet channels of frame plate 114 and strained through the filter media towards filter plate 112, which forms the cake within the internal cavity of frame plate 114.

Each respective plate 110 includes a first support arm and a second support arm such as first support arm 120-1 and second support arm 120-2 that removably couple plate 110 with filter press device 10. Each respective support arm 120 extends outwardly from opposing side surfaces of suspension frame 118 towards one of elongated side rails 30. In some embodiments, support arm 120 supports plate 110 on elongated side rails 30 by interfacing with an upper end portion elongated side rails 30. In this way, plates 110 are removably coupled to filter press 10. In some embodiments, each support arm 120 includes a surface that abuts and interfaces with a corresponding portion of elongated side rail 30, such that support arm 120, and thusly plate 110, is capable of slidably traversing along elongated side rails 30. Accordingly, if following head assembly 50 moves towards stationary head assembly 40, plates 110 are forced along with the motion of following head assembly 50 and compressed between stationary head assembly 40. Similarly, if following head assembly 50 moves away from stationary head assembly 40, a gap can form between one or more adjacent plates 110. In some embodiments, plates 110 includes a gasket such as gasket 132 that creates a seal between adjacent plates 110 to prevent fluid from leaking between plates 110.

Figures 12A, 12B:
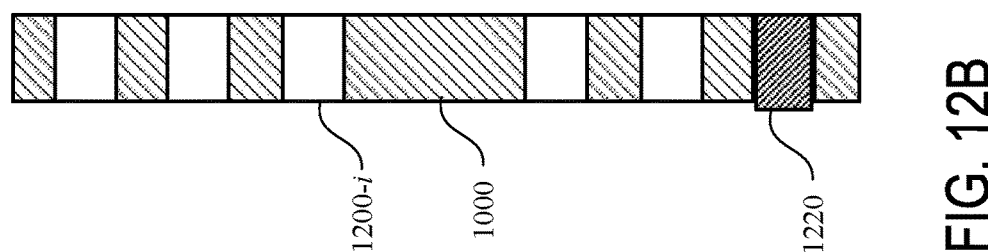
FIG. 12A and FIG. 12B illustrate a view of an exemplary adapter plate in accordance with embodiments of the present disclosure.
Figure 13:
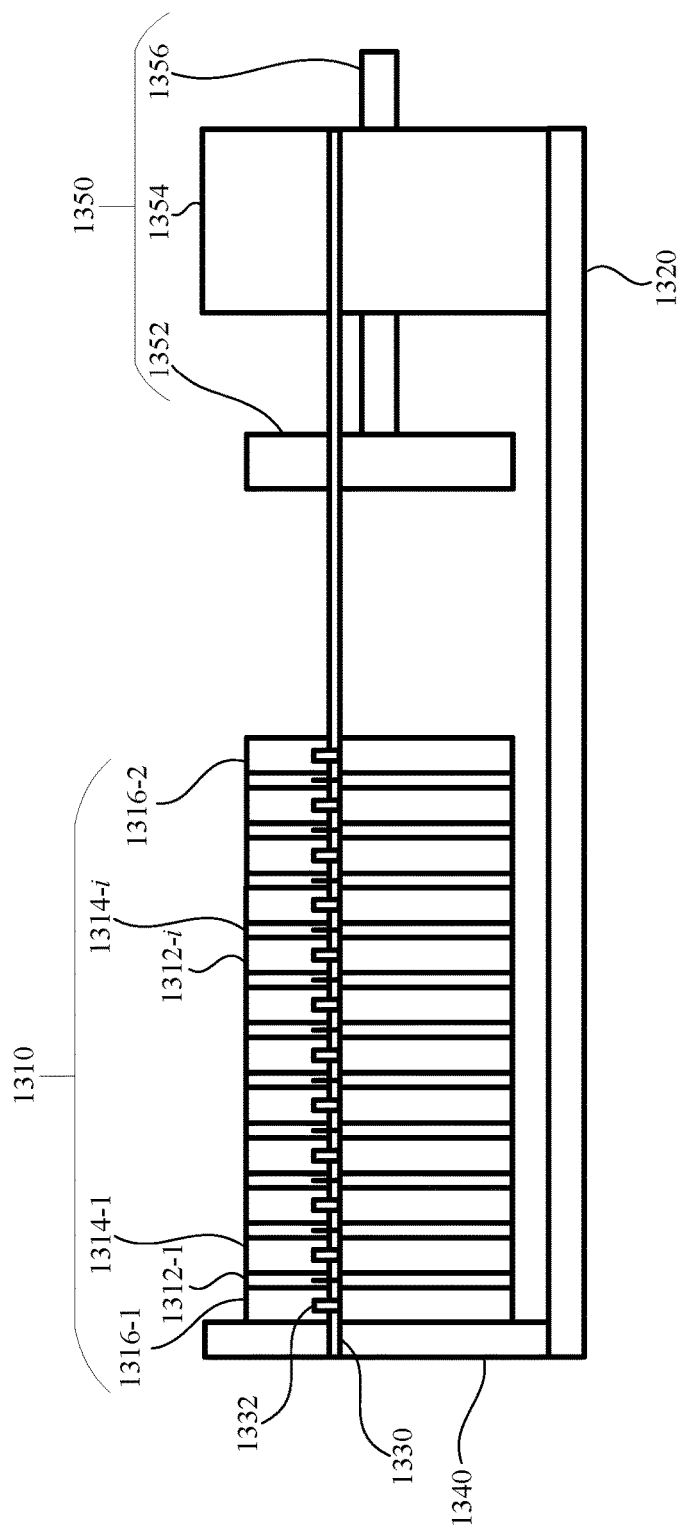
FIG. 13 illustrates a conventional filter press.

Each respective plate 110 is defined by a size such as a length and a width of suspension frame 118 (e.g., 20 centimeter (cm) length by 20 cm width, 30 cm length by 30 cm width, 40 cm length by 40 cm width, length L1 by width L2, etc.), a thickness of suspension frame 118 (e.g., 25 millimeters (mm) thick, 30 mm thick, 40 mm thick, etc.), or a combination thereof. As such, elongated side rails 30 are configured to support plate 110 of a specific size based on a distance lateral between elongated side rails 30. Each size of plate 110 generally has a unique array of channels since the channels of a respective plate 110 are disposed at the edge (e.g., corner) portions of the plate. For instance, referring briefly to FIG. 12A, a first size of plate 110 has channels 1200 (e.g., channels 140) disposed at positions L1 by L1, while a second size of plate 110 has channels 1200 disposed at positions L2 by L2. Moreover, the present disclosure allows for a variety of configurations of varying plates 110 of the same size but different thicknesses (e.g., first plate 110-1 of 20 cm by cm 20 and 5 cm thick, second plate 110-2 of 20 cm by 20 cm and 1 cm thick, etc.).

Figure 8B:
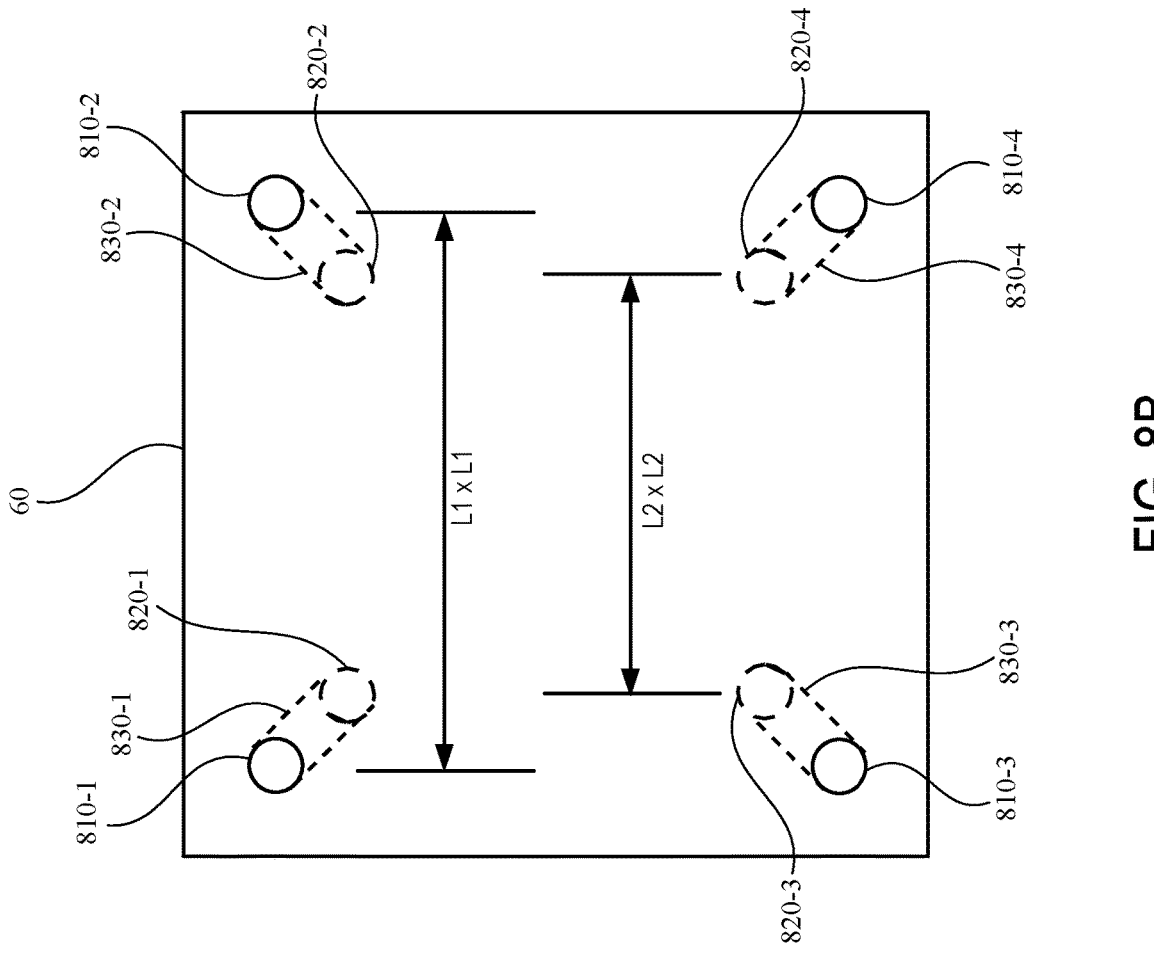
FIG. 8B illustrates a front view of the exemplary adapter plate of FIG. 8A.
Figure 8A:
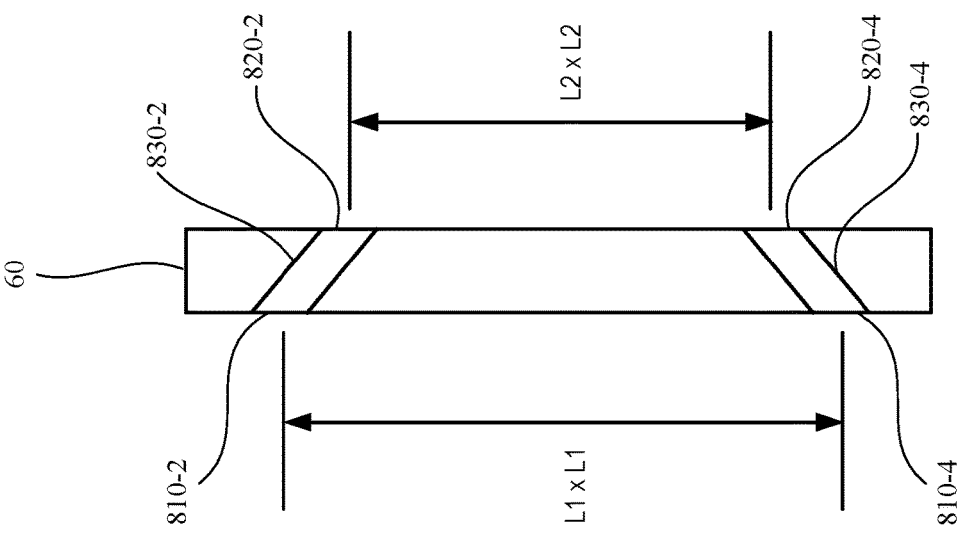
FIG. 8A illustrates a side view of an exemplary adapter plate in accordance with embodiments of the present disclosure.
Figure 9B:
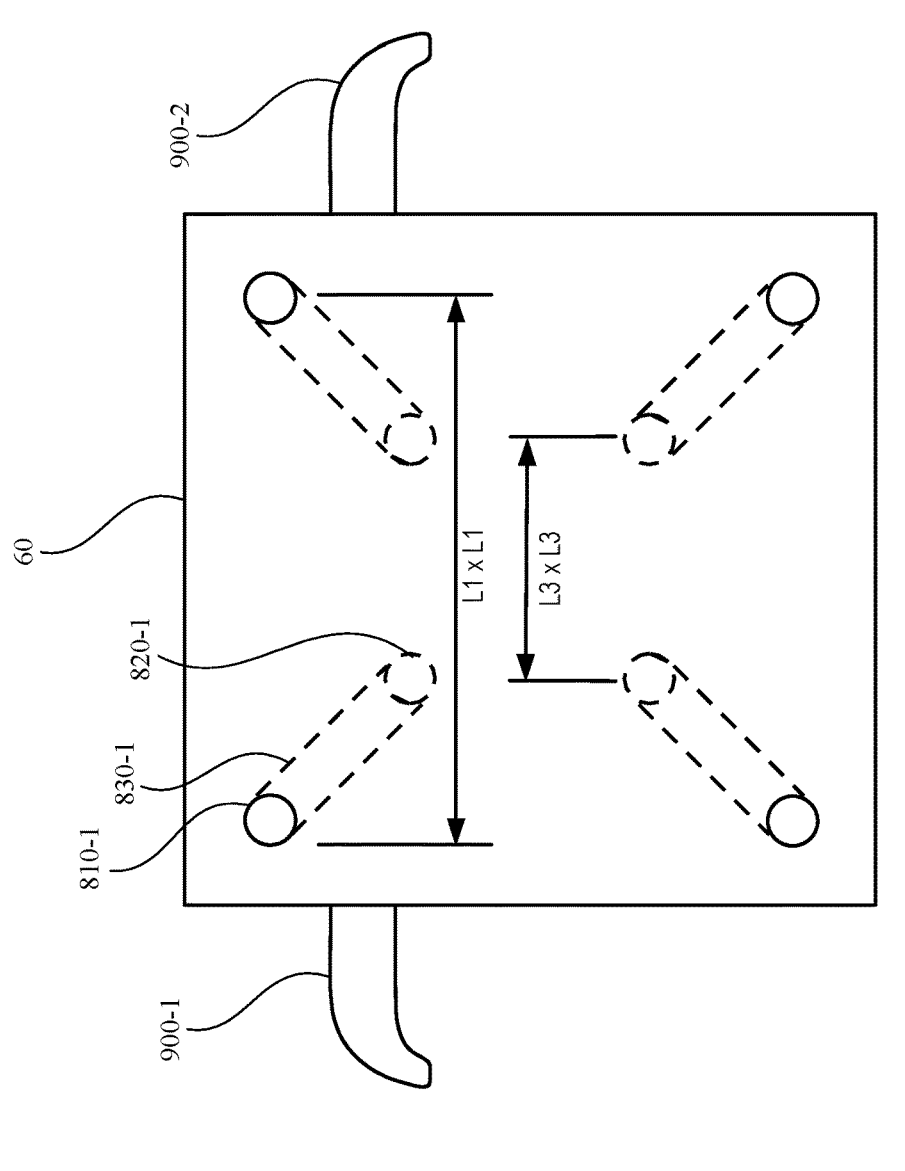
FIG. 9B illustrates a front view of an exemplary adapter plate in accordance with embodiments of the present disclosure.
Figure 9A:
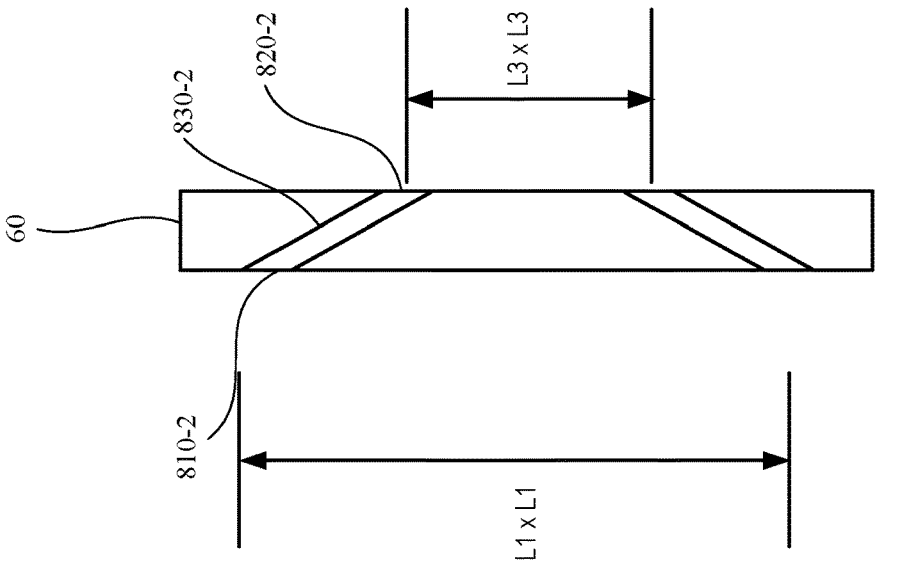
FIG. 9A illustrates a side view of an exemplary adapter plate in accordance with embodiments of the present disclosure.
Figure 10:
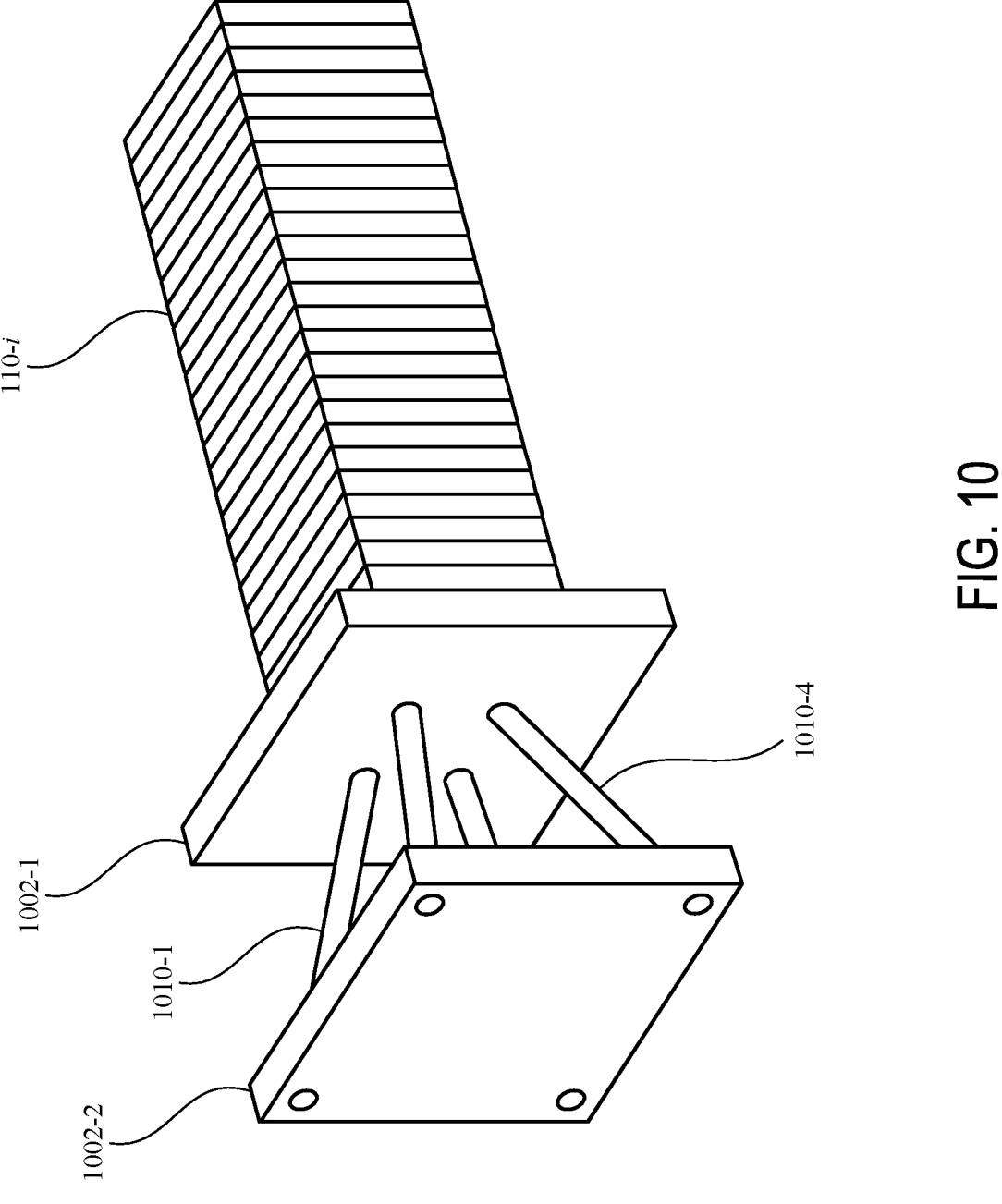
FIG. 10 illustrates a view of an adapter plate and a plurality of plates in accordance with embodiments of the present disclosure.
Figure 11:
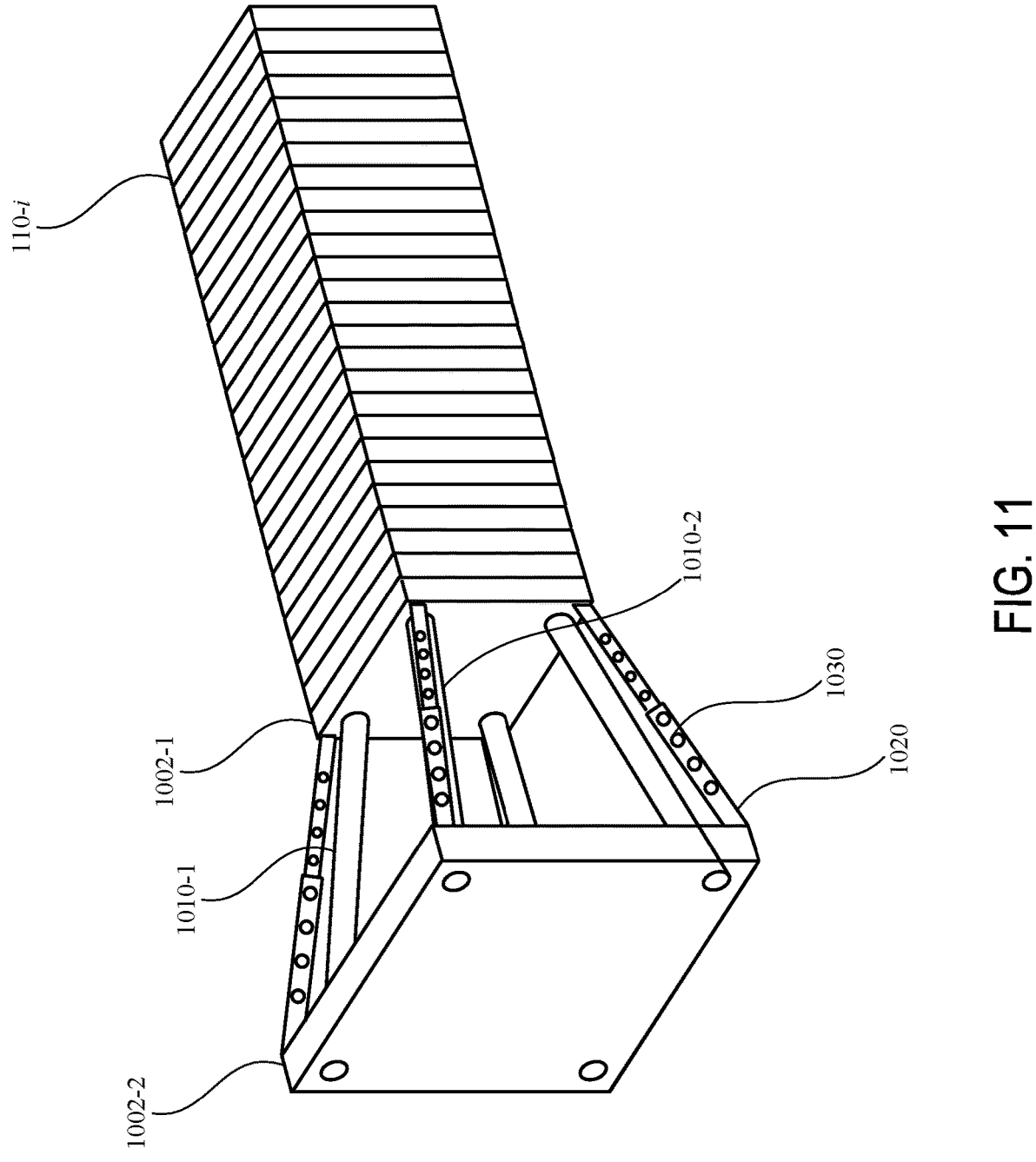
FIG. 11 illustrates a view of an adapter plate and a plurality of plates in accordance with embodiments of the present disclosure.

To filter a media, fluidic communication must maintain between adjacent plates 110 during an operation of filter press device 10. However, if the operation using filter press device 10 requires different size plates 110, the channels of end filter plates 116 at an interface stationary head assembly 40 and/or following head assembly 50 will not align, ceasing fluidic communication within filter press device 10. Accordingly, an adapter plate such as adapter plate 60 is disposed interposing between the interface of plates 110 and end filter plate 116. Moreover, in some embodiments, adapter plate 60 is disposed interposing between the interface of end filter plate 116 and stationary head assembly 40. Adapter plate 60 includes a mechanism (e.g., one or more tubes such as tubes 1010 of FIG. 10, one or more channels 830 of FIG. 8, etc.) that provides fluidic communication between plates 110 and stationary head assembly 40 and/or end plate 116 that is configured to interface with stationary head assembly 40. In some embodiments, elongated side rails 30 support adapter plate 60 through a pair of support arms (e.g., support arms 900 of FIG. 9B) that extend outwardly from adapter plate 60. In this way, adapter plate 60 is configured to slidably traverse elongated side rails 30 similar to support arms 120 of plates 110.

Referring back to FIGS. 1A-1B, since conventional filter press devices are capable of accommodating only a predetermined size of plates 110, frame adapters 70 allow these filter press devices to accommodate a different (e.g., smaller) size of plate 110, which otherwise would not be accommodated by filter press device 10, without modifying a structure of filter press device 10. Accordingly, frame adapters 70 support each, or optionally some, of plates 110 on elongated side rails 30. Frame adapters 70 engage with suspension frames 118, or a portion of suspension frame 118 such as support arm 120, of plates 110. In this way, elongated side rails 30 of filter press device 10 can support various combinations of sized plates 110 by providing prolonged linkages to elongated side rails 30, without needing to modify an existing structure of filter press device 10, and, optionally, plates 110. In some embodiments, frame adapters 70 include a corresponding frame adapter 70 for each respective plate 110 utilized by filter press device 10, such as frame adapters 250 of FIG. 2 through FIG. 4. In this way, each respective plate 110 and corresponding frame adapter 250 is configured to move independently from other plates 110.

Figure 2:
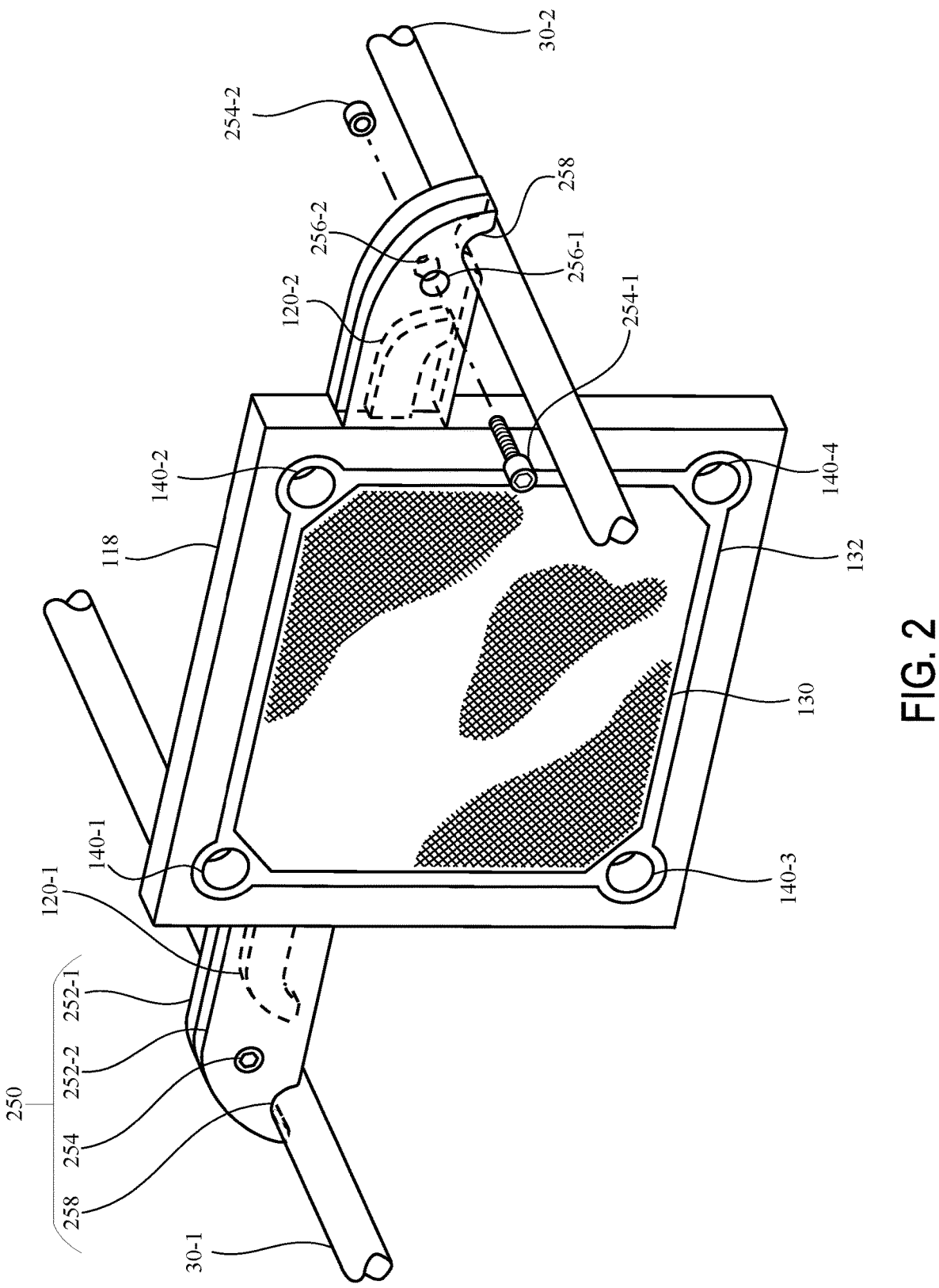
FIG. 2 illustrates an exemplary supporting adapter and a plate in accordance with embodiments of the present disclosure.
Figure 3:
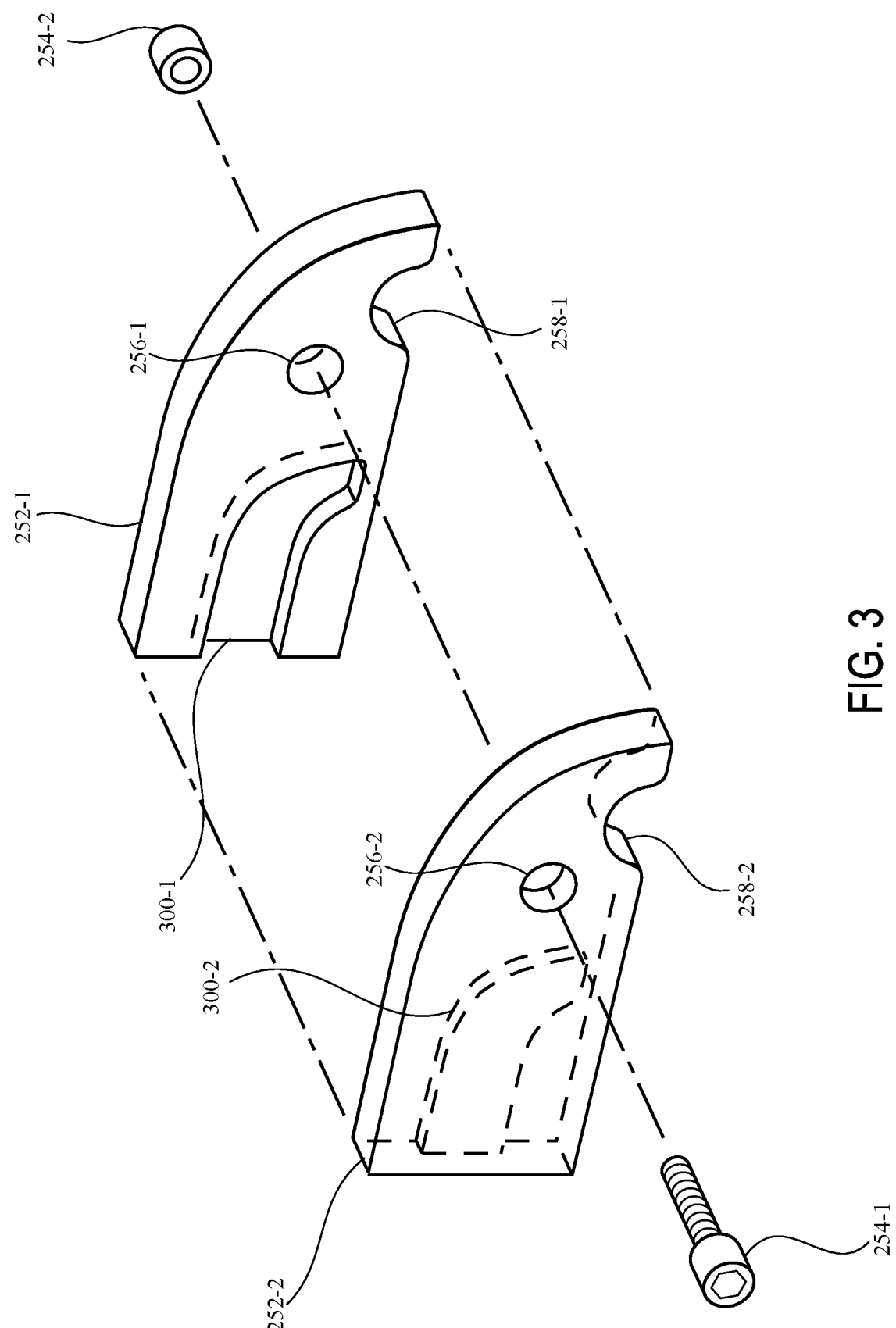
FIG. 3 illustrates an exploded view of the exemplary supporting adapter of FIG. 2.
Figure 4:
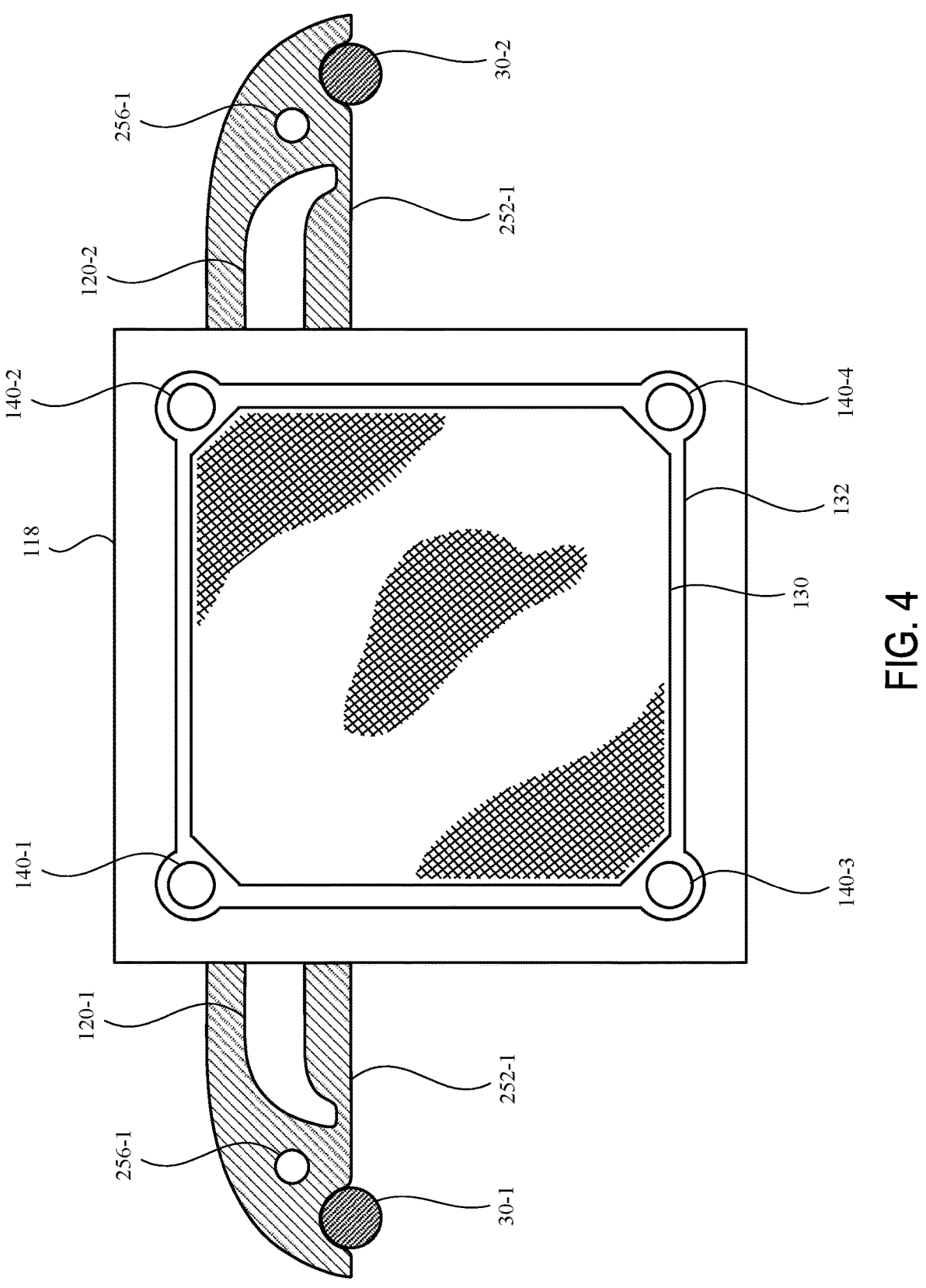
FIG. 4 illustrates a view of an exemplary encompassing adapter and a plate in accordance with embodiments of the present disclosure.

Referring to FIG. 2 through FIG. 4, in some embodiments, frame adapters 70 include a supporting frame adapter such as supporting frame adapter 250 that removably interfaces with a respective plate 110. Supporting frame adapter 250 includes first enclosing portion 252-1 and second enclosing portion 252-2 that opposes first enclosing portion 252-1. Collectively, enclosing portions 252 accommodate and interface with a respective support arm 120 of the corresponding plate 110. In some embodiments, first enclosing portion 252-1 and second enclosing portion 252-2 removably engage with each other through a coupling mechanism such as coupling mechanism 254 (e.g., screw 254-1 and threaded holes 256-1 and 256-2, a pin, a bayonet catch, etc.). However, in other embodiments, enclosing portions 252 are integrally formed with each other (e.g., formed as a single element). In some embodiments, coupling mechanism 254 incudes through-hole 256, which penetrates external faces of enclosing portions 252-1 and 252-2. In some embodiments, through-hole 256 accommodates a connector such as screw 254 that penetrates through-hole 256, coupling first enclosing portion 252-1 and second enclosing portion 252-2. Accordingly, coupling mechanism 254 allows for removable engagement of enclosing portions 252 and support arms 120 using a mechanism that is simple to operate. Moreover, enclosing portions 252 do not require modifications to either a structure of filter press device 10 or plates 110 to interface with plates 110 or elongated side rails 30. This removable engagement allows for supporting frame adapter 250 to be disposed on different plates 110 without modifying an integrity of suspension frame 118 for plates 110. Furthermore, each supporting frame adapter 250 consumes a minimal volume, which prevents excess plates 110 that would otherwise not be utilized. Additionally, since supporting frame adapters 250 couple with only a portion of supporting arms 120 of plate 110, material consumption for fabrication is greatly reduced.

Enclosing portions 252 each include a first groove such as first groove 300-1 disposed at a first edge portion of the respective enclosing portion 252. First groove 300 accommodates and interfaces with a portion (e.g., some or all) of support arm 120, such that a surface of support arm 120 interfaces with a portion of first groove 300. First groove 300 is substantially the same size (e.g., within a tolerance in a range of from 1 mm to 0.005 mm) as the portion of support arm 120. In this way, excessive movement of support arm 120 within supporting frame adapter 250 is prevented while allowing for removable engagement between support arm 120 and supporting frame adapter 250. Thus, first groove 300 provides an interaction area between support arm 120 and supporting frame adapter 250, allowing for supporting frame adapter 250 to support a load of plate 110 with minimal movement between support arms 120 and supporting frame adapter 250. Additionally, in some embodiments, a second groove such as second groove 258 is disposed at a second edge portion of each enclosing portion 252. Second grove 258 supports plate 110 on elongated side rails 30 by interfacing with an upper end portion of elongated side rail 30. Accordingly, in some embodiments, a shape (e.g., curvature) of second groove 258 corresponds to a shape of elongated side rail 30, allowing for a smooth (e.g., stable) traversing motion of plate 110 along elongated side rail 30 via supporting frame adapter 250.

Figure 5:
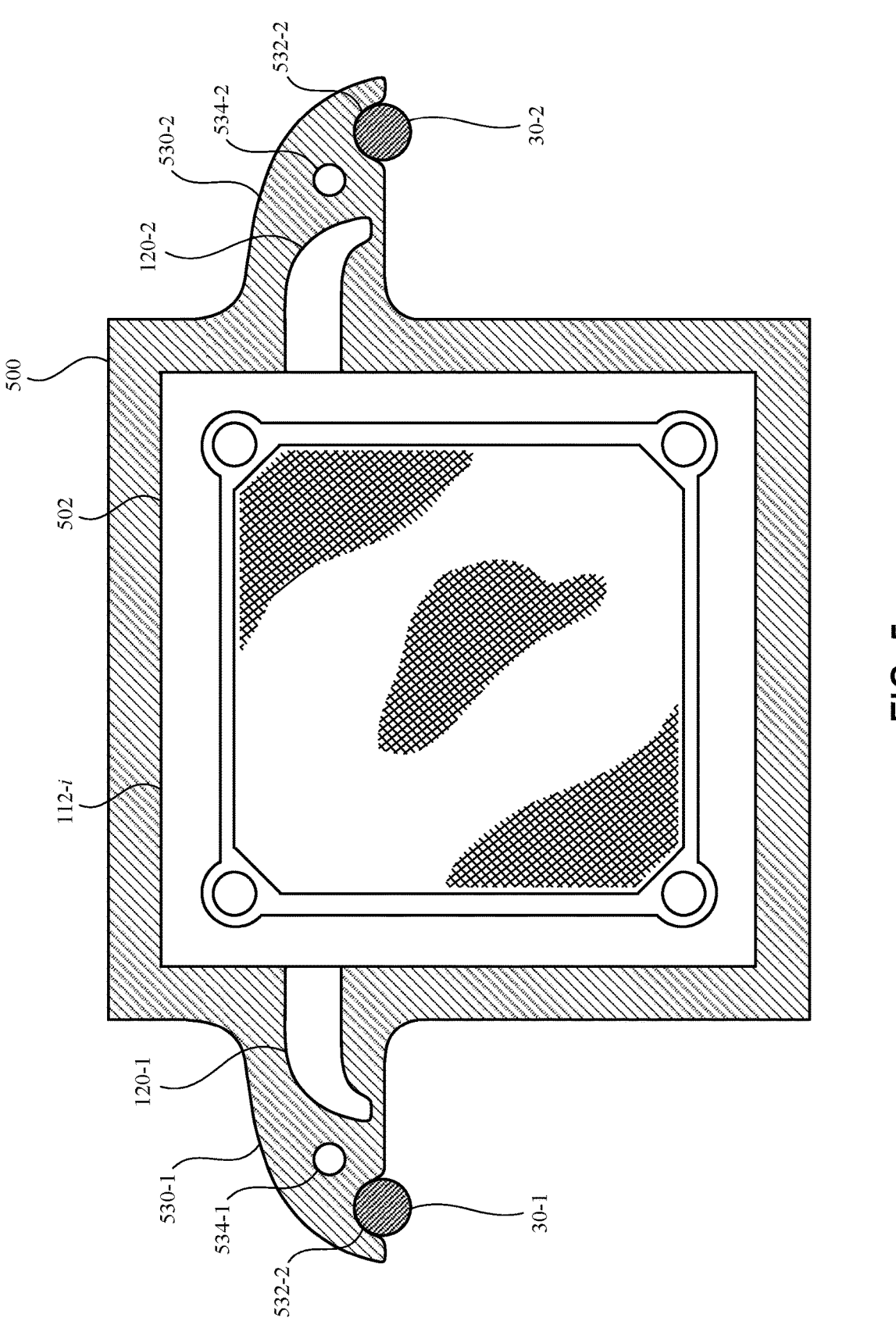
FIG. 5 illustrates a view of an exemplary encompassing adapter and a plate in accordance with embodiments of the present disclosure.
Figure 6:
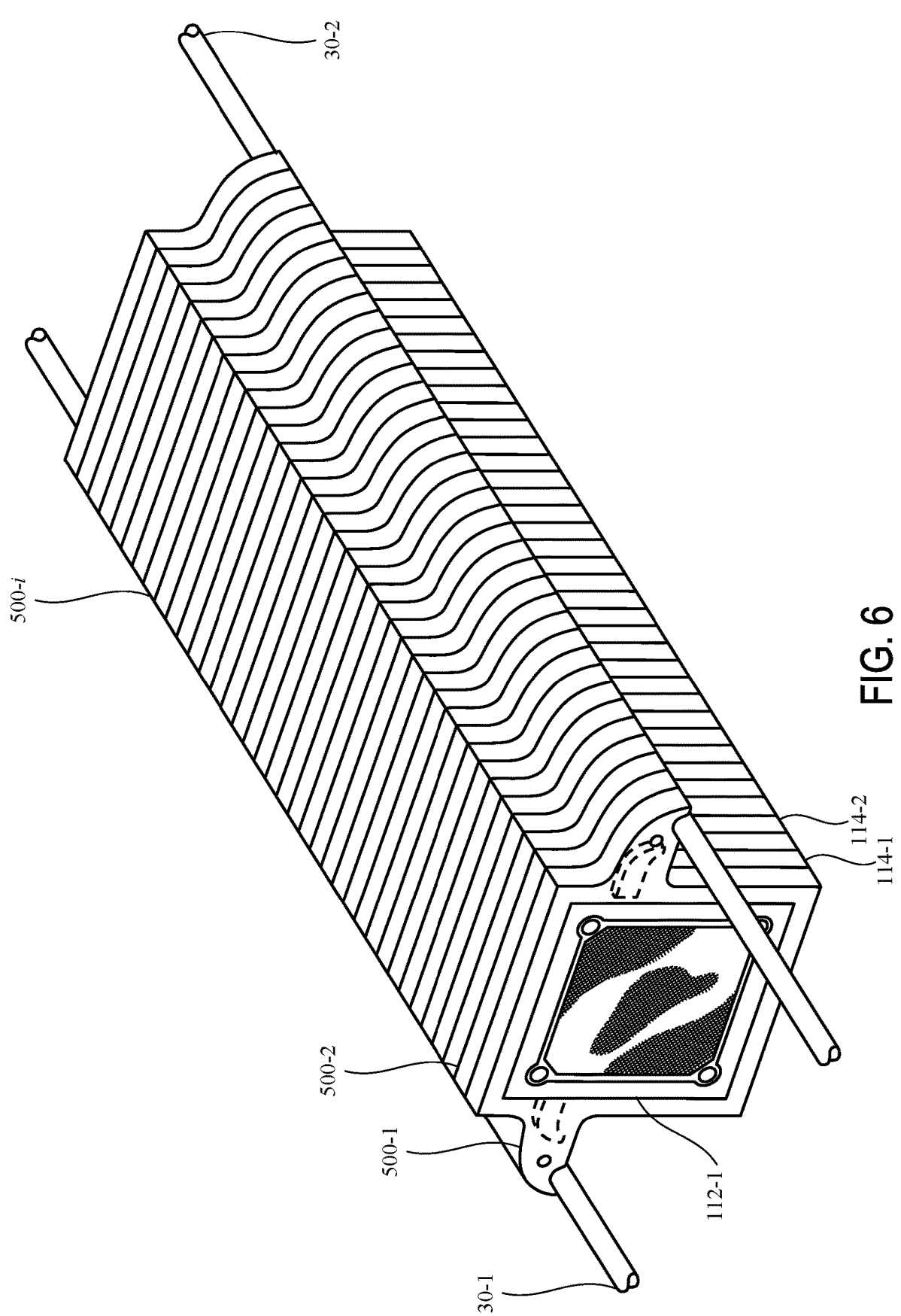
FIG. 6 illustrates a view of a plurality of exemplary encompassing adapters of FIG. 5.

Referring to FIG. 5 and FIG. 6, in some embodiments, the one or more frame adapters include an encompassing frame adapter such as encompassing frame adapter 500. Encompassing frame adapter 500 surrounds a portion of suspension frame 118 of plate 110, which can provide additional leaking protection during operation of filter press device 10. In some embodiments, encompassing frame adapters 500 includes a through-hole such as through-hole 502 that defines an external surface and an internal surface of encompassing frame adapter 500. In some embodiments, the internal surface defined by through-hole 502 has substantially the same perimeter as suspension frame 118, allowing for encompassing frame adapter 500 to accommodate and encompass plate 110 within the internal surface. Moreover, through-hole 502 of encompassing frame adapter 500 exposes adjacent faces of filter plate 112 and frame plates 114, permitting cake formation between these adjacent filter plates 112 and frame plates 114 and subsequent removal of the cake from filter press device 10.

In some embodiments, encompassing adapter 500 includes a first support arm and a second support arm such as support arms 530 (e.g., first support arm 530-1 and second support arm 530-2). Support arms 530 extend outwardly from an external surface of encompassing adapter 500 and interface with elongated side rails 30, such that plate 110 is supported on elongated side rails 30. This support provided by support arms 530 is similar to the support provided by support arms of supporting frame adapters described above (e.g., using a first groove, a second groove, and an interaction area as, such as groove 532 of FIG. 5). Accordingly, support arms 530 of encompassing adapter 500 allow for plates 110 of smaller sizes to be used on a larger size filter press device 10 (e.g., a 20 cm by 20 cm plate 110 on filter press device 10 designed to accommodate 40 cm by 40 cm plates 110), since the smaller sized plate 110 would otherwise be unsupported by elongated side rails 30 due to their short size. In some embodiments, encompassing adapters 500 includes a gasket (e.g., gasket 132 of FIG. 4) disposed on one or more side surfaces of through-hole 502, providing yet a further layer of leakage prevention between encompassing adapter 500 and plates 110. In some embodiments, encompassing adapter 500 includes a first portion and a second portion that removably engage to surround plate **110-*i* and form encompassing adapter 500. In some embodiments, an end portion of encompassing adapter includes a deformable damper that is configured to engage with following head 52. In this way, following head 52 applies a force to plates 110 through the dampener as opposed to applying a direct force to encompassing adapter 500. Moreover, by applying a force to plates 110, plates 110 can move independent of encompassing adapter 500. According, encompassing adapter 500 allows for different sized plates 110 to be used on larger sized filter presses 10** with a minimum number of elements.

Figure 7:
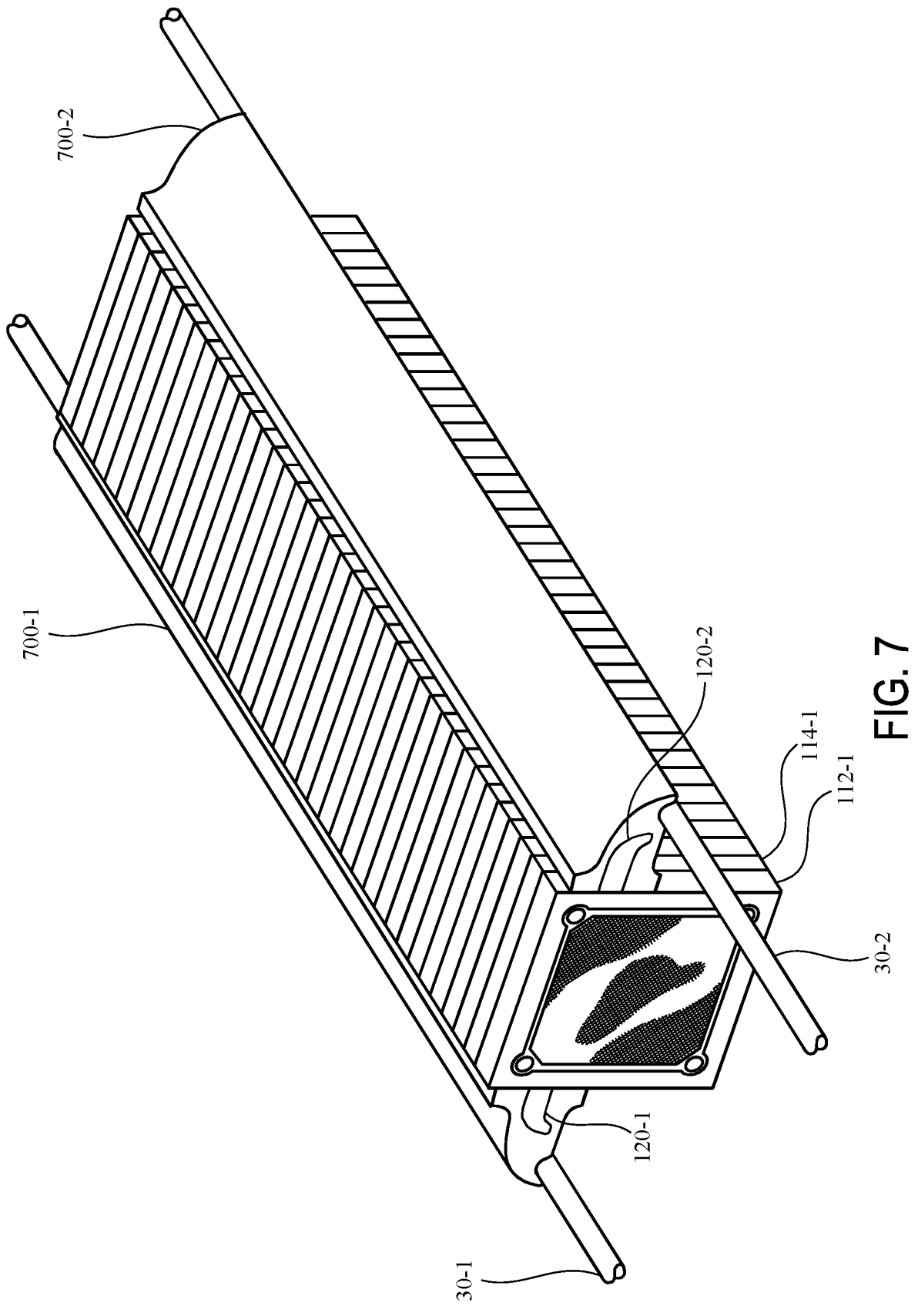
FIG. 7 illustrates a view of an exemplary sleeve adapter and a plurality of plates in accordance with embodiments of the present disclosure.

Referring to FIG. 7, in some embodiments, the one or more frame adapters include one or more sleeve frame adapters such as sleeve frame adapter 700 (e.g., first sleeve frame adapter 700-1 and second sleeve frame adapter 700-2). Sleeve frame adapter 700 accommodate support arm 120 of one or more plates 110. The support provided by sleeve frame adapters 700 is similar to the support provided by the support arms of the supporting frame adapters described above (e.g., using a first groove, an interaction area, and a second groove). In some embodiments, support arm 120 is slidably traversable within sleeve frame adapter 700, allowing plates 110 accommodated by sleeve frame adapter 700 to move according to a motion of following head assembly 50 independent of sleeve frame adapter 700. Moreover, in some embodiments, sleeve frame adapter 700 allows more than one plate 110 to be supported on elongated side rails 30 with a minimal number of parts, since sleeve frame adapters 700 are capable of supporting any number of plates 110.

Referring to FIG. 8A through FIG. 9B, in some embodiments, to provide fluidic communication between plates 110 and stationary head assembly 40, an adapter plate such as adapter plate 60 is provided interposing between a terminal plate 110 and stationary head assembly 40, or, optionally, between an end plate 116 and stationary head assembly 40. Moreover, in some embodiments, adapter plate 60 interposes between terminal plate 110 and end plate 116, as depicted in FIG. 1A. In some embodiments, adapter plate 60 includes a first surface abutting an adjacent surface end plate 116 and a second surface opposing the first surface and abutting an adjacent surface of stationary head assembly 40. The first and second surfaces of adapter plate 60 include a respective plurality of openings such as openings 810 and

820. Moreover, a plurality of channels such as channels 830 traverse from one of openings 810 to one of openings 820 and align with corresponding channels 140 of adjacent plates 110. In this way, fluidic communication is provided between plates 110 and stationary head assembly 40 even though plates 110 are of a different size than originally configured for stationary head assembly 40. For instance, consider filter press device 10 configured to accommodate a first plurality plates 110 of a first size (e.g., L1 by L1), and a second filter plates 110 are of a second size (e.g., L2 by L2) will be used with filter press device 10. Accordingly, second plurality of plates 110 are accommodated and interface with elongated side rails 30 via frame adapters. Openings 810 are a disposed at positions L1 by L1 from a center position of adapter plate 60 and correspond with channels 140 of stationary head assembly 40 and openings 820 are disposed at positions L2 by L2 from the center position of adapter plate 60. Furthermore, channels 830 are formed traversing adapter plate 60 and connecting openings 810 and 820, such that fluidic communication is provided between plates 110. In some embodiments, adapter plate 60 includes support arms such as support arms 900 (e.g., first support arm 900-1 and second support arm 900-2) that each extend outwardly from an external surface of adapter plate 60. Support arm 900 engage elongated side rails 30 and support adapter plate 60, similar to the support provided by support arms of supporting frame adapters described above (e.g., using a first groove, an interaction area, and a second groove).

Referring to FIG. 10 through FIG. 12B, in some embodiments, an adapter plate mechanism such as adapter plate mechanism 1000 provides fluidic communication is provided between plates 110. Adapter plate mechanism 1000 includes a first adapter plate and a second adapter plate such as adapter plates 1002 (e.g., first adapter plate 1002-1, second adapter plate 1002-2). Each respective adapter plate 1002 includes opposing surfaces and an array of channels traversing between the opposing surfaces through the adapter plate 1002. In some embodiments, the surfaces includes a plurality of channels such as channels 1200 (e.g., first channel 1200-1, second channel 1200-2, etc.) that align with corresponding channels 140 of an end plate 116, stationary head assembly 40, a terminal plate 110, or a combination thereof. For instance, in some embodiments, adapter plate 1002 includes one or more array of channels 1200 that correspond to unique sizes of plate 110 (e.g., first array of channels 1200 correspond to plates 110 of L1 by L1 size, second array of channels 1200 correspond to plates 110 of L2 by L2 size, etc.). For instance, channels 1200 of FIG. 12A are formed in a first plurality of positions corresponding a first size of plate 110 (e.g., L1 by L1), in a second plurality of positions corresponding a second size of plate 110 (e.g., L2 by L2), and a third plurality of positions corresponding a third size of plate 110 (e.g., L3 by L3). Using an array of channels 1200 that correspond to different plate 110 sizes allows for any combination of plate 110 sizes to be used with adapter plate mechanism 1000. Accordingly, in some embodiments, one or more plugs such as plug 1220 removably engages with a corresponding channel 1200, such that plug 1220 arrests or retards fluidic communication through channel 1200. Plugs 1220 typically engage with channels 1200 not being used in an instant filter press operation. Additionally, plugs 1220 minimize the required maintenance of plates 110 by preventing media from traversing through channels 1200 that would otherwise be exposed to media and require subsequent require cleaning. In this way, adapter plate mechanism 1000 allow plates 110 of any size for use with filter press device 10.

In some embodiments, a one or more tubes such as tubes 1010 extend from channels 1200 of first adapter plate 1000-1 to corresponding channels 1200 of second adapter plate 1000-2. In some embodiments, tubes 1010 are formed from a flexible (e.g., elastic) material. Tubes 1010 extend a distance between end plate 116 and plates 110, while maintaining fluidic communication between the channels of plates 110. In some embodiments, tubes 1010 are configured to prevent dead volume of media with tubes 110 and reduce occurrences of turbulent media flow. In some embodiments, tubes 1010 includes telescopic tubes, allowing for adjustment of a distance of between adapter plates 1000 according to a designed use. In some embodiments, one or more spacers such as spacers 1030 extend longitudinally and interpose between outer edge portions of adapter plates 1000. Spacers 1030 allow for a user of filter press 10 to adjust a length of tubes 1030. Moreover, in some embodiments, spacers 1030 displace a received force, such as a force of plates 110 compressing between stationary head assembly 40 and fixed head assembly 50. In some embodiments, spacers 1030 include a cotter pin device (e.g., a plurality of through holes and a split pin, a hairpin, a bowtie pin, etc.), which allows for manual adjustment of spacers 1030 and transiently fixing a distance between adapter plates 1000. In some embodiments, spacers 1030 provide rigidity to filter press device 10.

Accordingly, the filter press adapters of the present disclosure allow for an increased throughput of a facility by allowing plates of varying sizes to be used during a filter press operating process. The filter press adapters of the present disclosure have a minimal number of components and simple mounting procedures, which enables improved handling and reduced maintenance for users. Since the filter presses of the present disclosure removably engage with a conventional filter press device, the integrity of the filter press device is not compromised. Moreover, the removably engagable features of the filter press adapters also improve the accuracy of an end-user while fitting the adapters to the frame.

For convenience in explanation and accurate definition in the appended claims, the terms "upper," "lower," "up," "down," "upwards," "downwards," "inner," "outer," "inside," "outside," "inwardly," "outwardly," "interior," "exterior," "front," "rear," "back," "forwards," and "backwards" are used to describe features of the exemplary embodiments with reference to the positions of such features as displayed in the figures. Furthermore, it should be noted that the term "side" does not necessarily mean an outmost edge of an element of the present disclosure.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A filter press device comprising:
a supporting frame;
a first elongated side rail and a second elongated side rail disposed parallel thereto and on a first side portion and a second side portion of the supporting frame respectively;
a stationary head assembly disposed on a first end portion of the supporting frame and adjacent to each of the first elongated side rail and the second elongated side rail, wherein the stationary head assembly comprises a first array of channels defined by a first length;
a following head assembly disposed on a second end portion of the supporting frame and adjacent to each of the first elongated side rail and the second elongated side rail, the following head assembly movable along a lengthwise direction of the first elongated side rail and the second elongated side rail forwardly towards and rearwardly away from the stationary head assembly;
a plurality of plates supported on and between the first elongated side rail and the second elongated side rail by one or more frame adapters slidably coupling each plate in the plurality of plates to the first elongated side rail and the second elongated side rail, wherein:
each respective plate in the plurality of plates comprises:
a second array of channels defined by a second length different from the first length, and
a first support arm and a second support arm outwardly extending from opposing side surfaces of the respective plate, wherein each respective support arm supports the respective plate on a member selected from the first elongated side rail and the second elongated side rail, and wherein each respective support arm is accommodated by a frame adapter in the one or more frame adapters, and
the plurality of plates is movable along the lengthwise direction of the first elongated side rail and the second elongated side rail forwardly towards and rearwardly away from the stationary head assembly between the stationary head assembly and the following head assembly in accordance with a movement of the following head assembly; and
an adapter plate interposes between the plurality of plates and the stationary head assembly, wherein the adapter plate comprises:
a first surface abutting an adjacent surface of an end plate in the plurality of plates,
a second surface opposing the first surface and abutting an adjacent surface of the stationary head assembly, and
a plurality of channels, each respective channel in the plurality of channels traversing from the first surface to the second surface and connecting a corresponding channel in the first array of channels on the first surface to a corresponding channel in the second array of channels of the second surface, thereby providing fluidic communication between the plurality of plates and the stationary head assembly.

2. The device of claim 1, wherein each of the one or more frame adapters comprises a supporting frame adapter, wherein the supporting frame adapter comprises a first enclosing portion and a second enclosing portion opposing the first enclosing portion and removably coupled thereto, and wherein each of the first enclosing portion and the second enclosing portion of the supporting frame adapter comprises:

a first groove disposed at a first edge portion of the enclosing portion, the first groove accommodating a portion of the support arm;

a coupling surface configured to removably engage with a corresponding coupling surface of an opposing enclosing portion of the supporting frame adapter; and a second groove disposed at a second edge portion of the enclosing portion, the second groove supporting the plate on a member selected from the first elongated side rail and the second elongated side rail.

3. The device of claim 2, wherein for each enclosing portion of the supporting frame adapter, each coupling surface defines a through hole disposed on a face of the enclosing portion and aligned with a corresponding through hole of the opposing enclosing portion of the supporting frame adapter, the through hole accommodating a connector penetrating each through hole of the supporting frame adapter.

4. The device of claim 1, wherein each of the one or more frame adapters comprises an encompassing frame adapter surrounding a first external surface of a respective plate in the plurality of plates, wherein the encompassing frame adapter comprises a through-hole defining a second external surface and an internal surface of the encompassing frame adapter, and wherein:

the internal surface corresponds to the first external surface of the respective plate and configured to accommodate the plate; and the second external surface comprises a first encompassing adapter support arm extending outwardly from a first side surface of the second external surface and a second encompassing adapter support arm extending outwardly from a second side surface opposing the first side surface of the second external surface, wherein each respective encompassing adapter support arm supports the respective plate on a member selected from the first elongated side rail and the second elongated side rail.

5. The device of claim 4, wherein the encompassing frame adapter is integrally formed with the plate.

6. The device of claim 4, wherein the encompassing frame adapter further comprises a gasket disposed about the internal surface of the encompassing frame adapter, thereby interposing between the internal surface of the encompassing frame adapter and the supporting frame of the plate.

7. The device of claim 1, wherein each of the one or more frame adapters comprises a first sleeve frame adapter and a second sleeve frame adapter, and wherein each sleeve frame adapter of the first sleeve frame adapter and the second sleeve frame adapter comprises:

a first groove disposed at a first edge of the sleeve frame adapter facing a first external surface of a respective plate in the plurality of plates, the first groove accommodating a member selected from the first support arm or the second support arm of each respective plate in the plurality of plates; and a second groove disposed at a second edge of the sleeve frame adapter, the second groove supporting the plurality of plates on a member selected from the first elongated side rail and the second elongated side rail.

8. A filter press device comprising:

a supporting frame;

a first elongated side rail and a second elongated side rail disposed parallel thereto and on a first side portion and a second side portion of the supporting frame respectively;

a stationary head assembly disposed on a first end portion of the supporting frame and adjacent to each of the first elongated side rail and the second elongated side rail, wherein the stationary head assembly comprises a first array of channels defined by a first length;

a following head assembly disposed on a second end portion of the supporting frame and adjacent to each of the first elongated side rail and the second elongated side rail, the following head assembly movable along a lengthwise direction of the first elongated side rail and the second elongated side rail forwardly towards and rearwardly away from the stationary head assembly;

a plurality of plates supported on and between the first elongated side rail and the second elongated side rail by one or more frame adapters slidably coupling each plate in the plurality of plates to the first elongated side rail and the second elongated side rail, wherein:

each respective plate in the plurality of plates comprises:

a second array of channels defined by a second length different from the first length, and a first support arm and a second support arm outwardly extending from opposing side surfaces of the respective plate, wherein each support arm supports the respective plate on a member selected from the first elongated side rail and the second elongated side rail, and wherein each support arm is accommodated by a frame adapter in the one or more frame adapters, and the plurality of plates traverses between the stationary head assembly and the following head assembly in accordance with a movement of the following head assembly; and an adapter plate mechanism interposes between the plurality of plates and the stationary head assembly, wherein the adapter plate mechanism comprises:

a first adapter plate comprising:

a first surface abutting an adjacent surface of an end plate in the plurality of plates, a second surface opposing the first surface and facing a third surface of a second adapter plate, and a first plurality of channels, each respective channel in the first plurality of channels aligned with a corresponding channel in the second array of channels and traversing from the first surface to the second surface, and the second adapter plate comprising:

the third surface, a fourth surface opposing the third surface and facing a fifth surface of the stationary head assembly, and a second plurality of channels, each respective channel in the second plurality of channels aligned with a corresponding channel in the first array of channels and traversing from the first surface to the second surface; and a plurality of tubes, wherein each respective tube in the plurality of tubes extends from a corresponding channel from the first plurality of channels and a corresponding channel from the second plurality of channels, thereby providing fluidic communication between the plurality of plates and the stationary head assembly.

9. The device of claim 8, wherein each respective tube in the plurality of tubes is a flexible tube.

10. The device of claim 9, further comprising a plurality of spacers, each respective spacer in the plurality of spacers extending horizontally and interposing between the first adapter plate and the second adapter plate.

* * * * *